United States Patent [19]
Wittlin

[11] Patent Number: 5,009,029
[45] Date of Patent: Apr. 23, 1991

[54] CONDUCTIVE TEMPERATURE CONTROL SYSTEM FOR PLANT CULTIVATION

[76] Inventor: Seymour I. Wittlin, 4951 Debs Way, Oceanside, Calif. 92056

[21] Appl. No.: 323,038

[22] Filed: Mar. 10, 1989

Related U.S. Application Data

[63] Continuation of Ser. No. 69,831, Jul. 6, 1987, abandoned.

[51] Int. Cl.$^5$ .............................................. A01G 31/00
[52] U.S. Cl. .......................................... 47/62; 47/58; 47/18
[58] Field of Search ........................... 47/18, 2, 62, 58

[56] References Cited

U.S. PATENT DOCUMENTS

| | | | |
|---|---|---|---|
| H239 | 3/1987 | Franklin et al. | 47/18 X |
| 607,143 | 7/1898 | Stoltz | 47/18 |
| 1,000,070 | 8/1911 | Camp | 47/18 |
| 1,022,616 | 4/1912 | Winandy | 47/18 |
| 1,222,648 | 4/1917 | Marks | 47/18 |
| 2,060,735 | 11/1936 | Krueger | 47/18 X |
| 2,062,755 | 12/1936 | Lyons et al. | 47/62 |
| 2,491,271 | 12/1949 | King | 47/18 |
| 2,545,717 | 3/1951 | Voigt | 47/18 |
| 3,766,684 | 10/1973 | Kato | 47/62 |
| 4,107,875 | 8/1978 | Bordine | 47/62 |
| 4,163,342 | 8/1979 | Fogg | 47/62 X |
| 4,309,843 | 1/1982 | Kato | 47/18 |
| 4,577,435 | 3/1986 | Springer et al. | 47/2 |

FOREIGN PATENT DOCUMENTS

| | | | |
|---|---|---|---|
| 3619953 | 12/1986 | Fed. Rep. of Germany | 47/18 |
| 2546031 | 11/1984 | France | 47/18 |
| 8501056 | 7/1985 | Netherlands | 47/18 |

*Primary Examiner*—Henry E. Raduazo
*Attorney, Agent, or Firm*—William J. Thomashower

[57] ABSTRACT

A method and apparatus for growing plants by controlling growing temperatures in conventional and hydroponic planting systems. Plants placed in a plant growing medium are contained in metal growing trays placed in contact with a closed metal piping system and disposed externally to and structurally supporting the growing trays and containing a temperature-controlled liquid, thereby providing conductive heat exchange with the plant growing trays and plants. The plants are also supplied with liquid nutrients and artificial light conductive to plant growth.

8 Claims, 2 Drawing Sheets

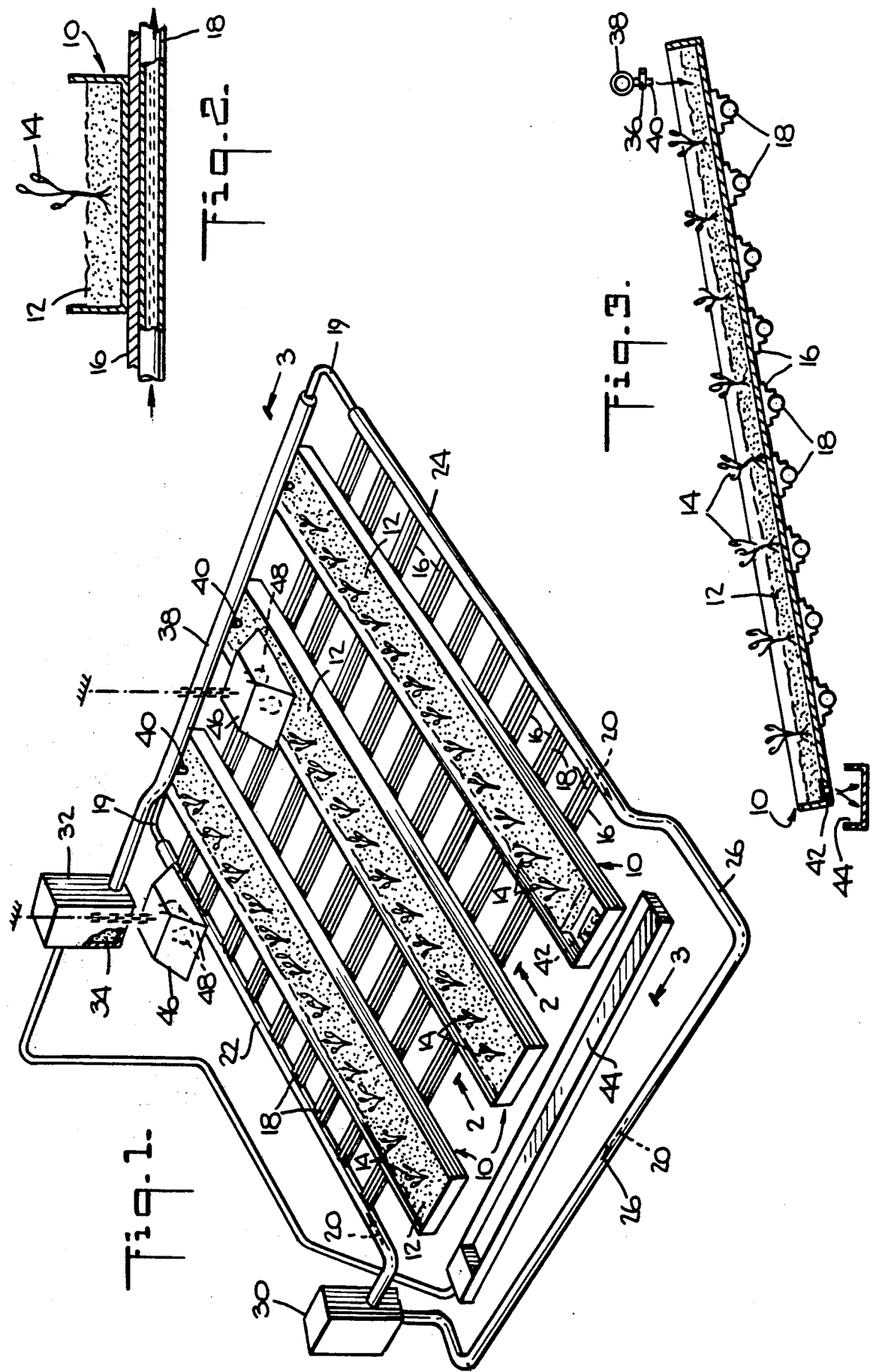

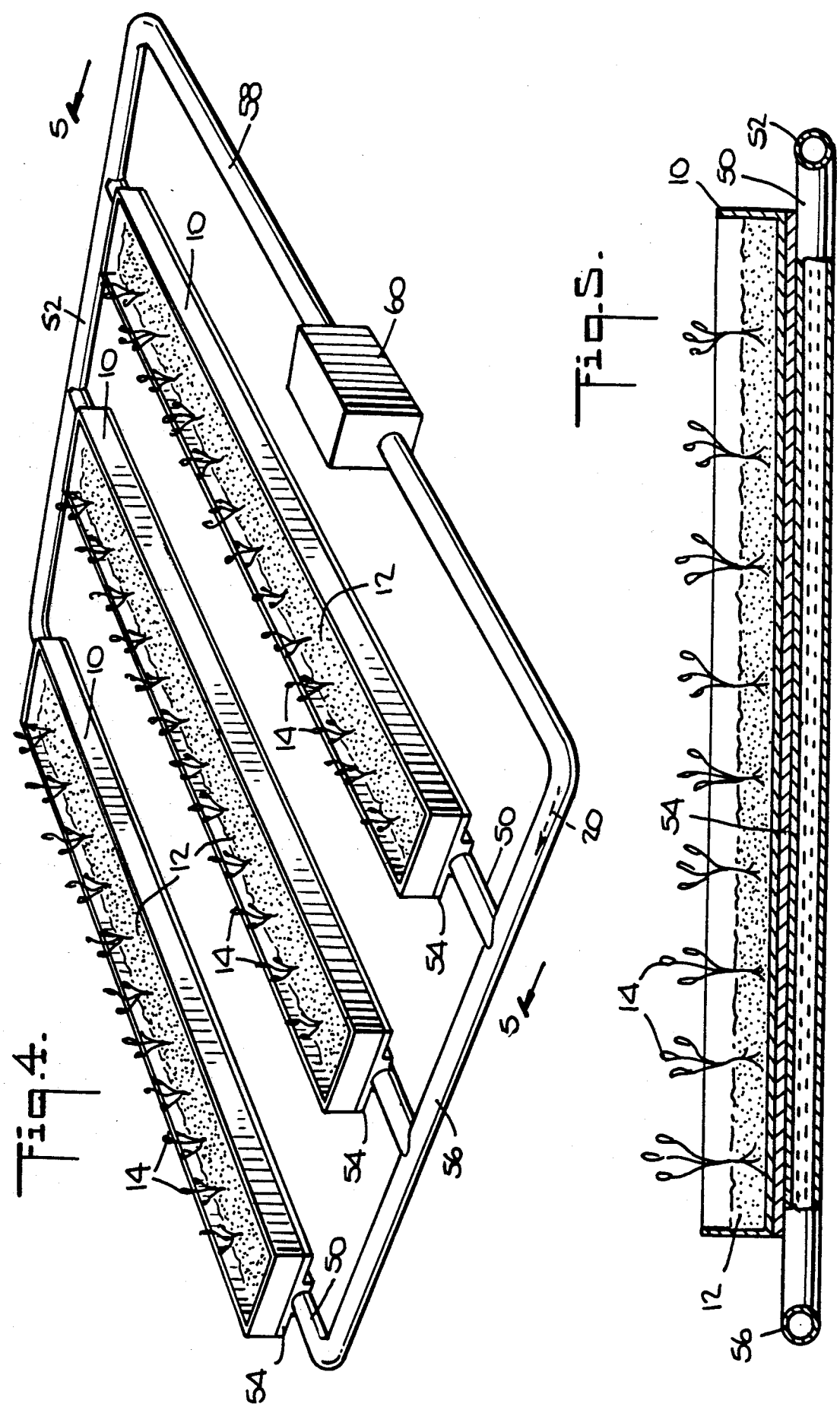

CONDUCTIVE TEMPERATURE CONTROL SYSTEM FOR PLANT CULTIVATION

This application is a continuation of application Ser. No. 069,831 filed July 6, 1987, abandoned.

BACKGROUND OF INVENTION

1. Field of Invention

This invention relates to a system, including a method and apparatus using heat conduction as a means to control temperatures in the growth of plants of various kinds. The system has application for improving the growth of all horticulturual products affected by temperature variations, such as plants, flowers, crops, vegetable produce and fruits, and is especially useful in conjuention with hydroponic plant growing systems in which the plants are grown in a nutrient solution with a growing medium to support the roots.

2. Description of the Prior Art

It is well known in the art of plant growing that growth is highly dependent on such factors as light, temperature, atmospheric gases and humidity. With particular reference to temperature, it is well known that plant growth can be increased or maximized by maintaining optimal plant growing temperatures. See, e.g., Pierce, *Green House Grow How*, (Lakeside Press 1977) at 27. Accordingly, the most direct and accurate temperature controls will maximize plant growth.

Prior art systems for controlling growing temperatures have primarily utilized enclosures, such as greenhouses, in which the overall ambient air temperature is controlled, usually by varying radiant heat from solar or artificial sources, use of heat pipes in contact with the air, or air heat pumps or air conditioners, or various combinations thereof. Such systems are disclosed, for example, in U.S. Pat. Nos. 1,212,097, 2,897,631, 2,153,871, 3,935,673, 4,163,342, 4,198,783, 4,292,762.

In these prior art systems, the temperature of the actual growing system of the plants, including the soil, roots, and plant structure, will in time move toward equilibrium with the temperature of the ambient air, the heat transfer method being primarily by convection.

Some systems have also used a partially conductive heat transfer, as in U.S. Pat. No. 4,320,594 for a Mass Algal Culture System, which is designed to affect the conditions for algae growth in a continuously moving liquid medium. U.S. Pat. No. 4,486,977 discloses a temperature controlled liquid flowing in exposed passages providing contact with surrounding air and parts of the structures for growing plants.

As is well known, air is less efficient for the transfer of heat energy than more dense substances, such as metal. Indeed air is used as an insulator such as found in double-walled window panes and what is known as a "double poly" greenhouse.

In addition, temperature gradients in a volume of air will limit the ability to control temperatures of articles in contact with such air.

Further, the convection and radiant heat transfer methods of the prior art may require considerably more time than a conductive heat transfer method to bring the overall temperature of a growing system to steady state conditions, or to correct variations which occur due to factors outside the enclosed growing environment.

The prior art systems using primarily temperature control of air, or heat transfer by convection of air suffer from temperature variations and require an unnecessarily lengthened period of time to achieve a steady state temperature in the plant growing system. In addition, control of air temperatures in an enclosed volume of air does not provide optimal temperature control within the growing medium itself. Further, the heating and cooling of large volumes of air is generally less efficient and more costly as a heat transfer method than controlling a confined and smaller volume of water or other liquid, having a higher heat conductivity than air.

U.S. Pat. No. 4,309,843 to Kato discloses a plant cultivation device using hot water pipes covered by "a layer of wood chips" over which is placed the "cultivation soil" Col. 1, lines 46–50. While Kato thus utilizes some conductive heat transfer, the layer of wood chips underneath the soil tends to impede the heat transfer from the liquid in the pipes, in a manner opposite the method and structure claimed in the present invention. Kato suffers from the additional drawbacks that its heating pipes are enclosed in a complex structure, as disclosed and claimed by Kato, involving concrete blocks 5, slate-corrugated plate 6, partition wall plates 2 and shielding cover 11. Being in effect buried under the growing medium, the pipes of Kato are not exposed, cannot be readily maintained, and will inhibit early detection of failures, such as leaks causing flooding of the growing medium and destruction of the plants.

Even temperature control systems adding open passages of or other contact with a temperature controlled fluid do not disclose the superior temperature control methods and apparatus of the present invention.

SUMMARY OF THE INVENTION

The present invention overcomes the problems of the prior art by providing a novel method and apparatus of economical construction with componets readily accessible for maintenance to obtain optimal control over the growing temperature for all parts of the plants and related physical growth elements, the plant growing system including nutrients, growing medium, roots and plant structure.

Accordingly, it is an object of the invention to control the temperature of all parts of this plant growing system by employing a temperature-controlled liquid in a closed and pressurized piping system arranged to permit conduction heat transfer with the plant growing system.

Another object of the invention is to provide direct metal to metal contact between the temperature control piping system and metal growing trays containing the growing medium, roots and plant structure so as to obtain maximum heat transfer by conduction between said trays and said piping system while at the same time utilizing the piping system to support the trays externally.

Another object of this invention is to increase plant yields over that available in nature by permitting plant growth in localities, seasons or climates having ambient air temperatures which would not otherwise be conducive for same, such as by providing cooling in hot climates or seasons and heating in cool climates or seasons. For example, the invention can be used in the cooling mode to offset increased temperatures of the kind anticipated by a world "greenhouse effect" due to changes in layers of the atmosphere. In conjunction with hydroponic growing techniques, this enables plant production many times greater than found in nature's unaided production.

It is a further object of the invention to provide means for controlling the ambient air temperature, composition, and light and to provide a flow of temperature-controlled plant nutrients, all with a view toward optimizing the growing temperature of the plants in an energy efficient system.

Another object of the invention is to facilitate increased plant yields from a greenhouse which may be located closer to centers of population than open fields, thereby reducing transportation costs, including fuel consumption, and making vegetables, fruits and other crops available at lower cost.

Other objects and advantages of this invention will be seen from the above and from the following description of the preferred embodiments when considered with the drawings and the appended claims.

BRIEF DESCRIPTION OF THE DRAWINGS

The above and other objects and significant advantages of the invention are made clear by the following description thereof, taken in conjunction with the accompanying drawings, wherein:

FIG. 1 is a perspective view of the growing trays, conductive heat transfer piping system, nutrient feed lines and artificial illumination;

FIG. 2 is a cross section of FIG. 1 along lines 2—2;

FIG. 3 is a cross section of FIG. 1 along lines 3—3;

FIG. 4 is a perspective view of an alternative construction of the growing trays and conductive heat transfer piping system;

FIG. 5 is a cross section of FIG. 4 along lines 5—5.

DETAILED DESCRIPTION OF THE PREFERRED EMBODIMENTS

The growing system of FIG. 1 comprises a set of growing trays 10 containing a growing medium 12, such as Vermiculite, pearlite, styrene, Oasis Horticubes ® made by Smithers-Oasis Co., (Kent, Ohio) or similar well known rooting media, for supporting the growth of a multitude of plants 14 in the growing trays 10. The growing trays are made of any material which will conduct heat and are preferably metal. They may be of any shape, including round pots, and are preferably rectangular.

The trays rest on a plurality of metal supports 16 which are flat at the top to provide maximum area of contact with the flat undersides of the growing trays 10 and are in direct contact with said trays. Weights may be added to the trays to insure that such metal to metal contact is complete over the entire surface area of the metal supports. The opposite side of the metal supports 16 also surround and preferably are dimensioned to fit tightly around and clamp pipes 18 to provide maximum surface contact therewith. The pipes 18 are arranged in a network, such as in parallel, to support the growing trays 10 at an angle with respect to the ground so that a plant nutrient solution 34 deposited at one end of the tray will flow by force of gravity to the opposite end. In this configuration, the piping system serves the dual function of heat conduction and structural support for the growing trays. Being thus external to the growing trays and growing medium, the arrangement facilitates detection of leaks and simplifies maintenance or replacement of the pipes.

A temperature-controlled liquid 20, such as water, is forced under pressure into a closed system, through an inlet manifold 22 which feeds all of the pipes 18 which run under the growing trays 10. Inlet manifold 22 also is connected to a branch line 19. The pipes 18 run in a plurality of pipe lines under the growing trays, and in contact therewith by means of the metal supports 16. Branch line 19 is placed in conductive heat exchange relationship with a plant nutrient solution 34 which flows through pipe 38. Branch line 19 preferably runs through the center of pipe 38 for most of the length of pipe 38 and is of small enough radial dimension to allow passage of the nutrient solution through the same pipe 38. At the end of the pipes 18 and branch line 19 opposite the inlet manifold is an exit manifold 24 to which pipes 18 and 19 are connected to permit the flow of liquid 20, which then exits through a line 26.

The temperature and pressure of the liquid 20 is controlled by a pumping station 30, having connection to the inlet manifold 22 and the exit line 26. The pumping station 30 contains a pump (not shown) to provide flow pressure to circulate the liquid 20 and a heat exchange system (not shown) to heat or cool the liquid 20 and maintain its temperature at a desired level while the liquid is circulating.

The growing system of FIG. 1 is also provided with a supply tank 32 containing the plant nutrient solution, 34, which flows by gravity through flow pipe 38 which has drip spouts 40 positioned over the ends of the growing trays having the higher elevation as between the two ends, in order to deposit the nutrient solution therein and permit its flow by gravity along the entire length of the trays. Adjustable clamps 36 are fitted on each drip spout 40 to regulate the flow of nutrient solution into the growing trays. After flowing down the length of the growing trays, and being absorbed on part by the growing medium 12, the nutrient solution escapes through filter covered holes 42 at the lower end of each growing tray. These holes 42 are positioned over a collection tray 44. The collection tray is elevated at the end farthest from the nutrient supply tank 32 so as to permit the flow of nutrient solution to the opposite end of the collection tray 44, enlarged to form a reservoir, from which the solution can be returned into supply tank 32 by an electric pump or manually (not shown), which may advantageously be activated from time to time by a float in tank 32 connected to a switch (not shown) to turn the pump on when the level in the tank falls to a predetermined point.

Artificial electric lighting containing the wavelengths known to be conducive to growth of the plants in the growing trays is provided by overhead fixtures 46 containing a plurality of lamps 48, connected to a power source (not shown).

The gaseous composition, temperature and humidity of the ambient air surrounding the plant leaves may, if desired, be controlled by enclosing the growing system of FIG. 1 in a chamber, such as a greenhouse, having controlled communication with the outside atmosphere and by providing inside the chamber, air which is moderated in regard to temperature and humidity by well known apparatus such as heaters, air conditioners, humidifiers or dehumidifiers, with external supply of oxygen, carbon dioxide or other gases to optimize growing conditions.

In FIG. 2, growing tray 10 is shown in continuous contact across its width with the support 16, which is in contact with the pipe 18 carrying the temperature controlled liquid 20. Conductive heat transfer occurs between the liquid 20 and the growing medium 12 and the plant 14, by conduction through the metal supports 16 and growing trays 10 supporting the growing medium 12.

In FIG. 3, the growing tray is shown in continuous contact across all or a substantial portion of its length with the supports 16, which are in contact with the pipes 18 carrying the temperature controlled liquid 20. Conductive heat transfer occurs between the liquid 20 and the growing medium 12 and the plant 14.

FIG. 4 shows an alternative embodiment of the invention in which the temperature controlled liquid 20 is contained in pipes 50 which are situated in parallel relation with the long dimension of the growing trays 10 which are in contact with said pipes by metal supports 54 which have a flat upper surface in contact the underside of the trays 10 and running along substantially the full length thereof. The opposite side of the metal supports 54 also surround and preferably are dimensioned to fit tightly around and clamp pipes 50 to provide maximum surface contact therewith. The pipes 50 receive a temperature controlled liquid 20 through an inlet manifold 52 which feeds all of the pipes 50. At the ends of the pipes opposite the inlet manifold is an exit manifold 56 into which the liquid 20 flows and exits through a line 58 which returns the liquid to a pumping station 60. The pumping station 60 is connected to inlet manifold 52 and contains a pump (not shown) to provide pressure to circulate the liquid 20 and a heat exchange system (not shown) to heat or cool the liquid and maintain its temperature at a desired level.

FIG. 5 shows the growing tray 10 of FIG. 4 and support 54 along the length of the growing tray 10 and in contact with both the underside of the growing tray and the pipe 50, which is connected to inlet manifold 52 and exit manifold 56.

As can be seen, in the preferred embodiment of the temperature-controlled growing system of FIG. 1 or the alternate embodiment in FIG. 4, the controlled temperature liquid provides temperature control by conductive heat transfer through direct contact with elements having high heat conductivity, namely the metal pipes, metal supports and metal growing trays, thereby providing optimal heat transfer to the growing medium 12 as well as to the nutrients, roots and the plant structure. Branch line 19 also permits conductive heat transfer between the temperature-controlled liquid and the nutrient solution, the temperature of which can thereby be maintained.

The system of this invention can be used for both heating or cooling to maintain the optimal growing temperature of the plants and nutrient solution, by circulating a liquid 20 which is hotter or cooler than the ambient air temperature around the trays. For example, cooling may be achieved by use of well water when its temperature is cooler than the ambient air temperature necessary to achieve the optimal growing temperature, and the closed circulation system permits return of such circulated water to the well with limited ecological risk.

The closed nature of the piping system for the temperature-controlled liquid 20 provides flexibility in the heat transfer process by allowing control not only of the temperature of the liquid in the pipes but also of the flow pressure of the liquid and the pipe diameter, which affect the rate of liquid flow through the pipes and, ultimately, the rate of heat transfer. In this fashion, temperature of the growing system can be modified and controlled not only by varying the temperature of the flowing liquid during operation, but also by the original selection of the diameter and thickness of the pipe, as well as variation of the pumping flow pressure during operation.

The clamp mounting of the supports 16 and 54 on the piping system also permit partial rotation of the supports about the pipe to insure that the upper flat surface of the support is in a plane parallel to the flat underside of the growing tray to promote complete contact across the entire surface of the support.

The alternate embodiment shown in FIGS. 4 and 5 has the advantage of providing conductive heat transfer along the entire length of the growing tray by direct contact at every point with a support which is itself in contact along its entire length with the piping system containing the temperature-controlled liquid. This embodiment would also be provided, as described in the preferred embodiment of FIG. 1, with appropriate nutrient circulation and feed lines, collection tray for nutrient recirculation, overhead illumination and enclosure of the system in a greenhouse type of structure to control the gaseous composition, temperature and humidity of the air surrounding the plants.

It should be noted, however, that in the alternate embodiment shown in FIGS. 4 and 5, because each growing tray will have an associated pipe in parallel, the number of trays and pipes will be limited in a given space depending on the width of the trays selected. In contrast, in the preferred embodiment of FIG. 1, there is no inherent physical relationship between the number of pipes and the number of growing trays.

In both embodiments, the conductive heat transfer system is augmented to provide and optimize other conditions necessary for plant growth. Thus proper illumination is provided by overhead lighting, plant nutrients are recirculated from tank 34 through the growing trays and growth media, and the surrounding air temperature, humidity and gaseous composition are controlled by enclosing the system in a greenhouse or closed chamber. The temperature control of the invention permits greater leeway in the use of illumination, since temperature changes caused thereby can be controlled in the plant growing system. Nutrient solution is monitored, such as by a hydroponic test kit, and replenished with water and chemicals as necessary to maintain the proper balance of nutrients. Likewise the surrounding air in the closed system can be enriched with oxygen, carbon dioxide or other gases as necessary to maintain the proper balance of atmospheric constituents.

The conductive heat transfer system of this invention provides a more direct and therefore more responsive and accurate control of the temperature of the growing system than prior art systems, particularly those dependent on convection heat transfer. There is also a reduction in heat loss and an increase in efficiency as compared to prior art systems.

The greater ability to control temperature permits optimization of growth conditions for plant photosynthesis and plant respiration.

The conductive heating system provides such direct and positive control of the temperature of the plant growing system, including growing medium, nutrients and the plant structure, that air temperature becomes less critical. Tests have shown that when the plant growing system is heated by the conductive heating system of this invention, the plants will survive and grow in ambient air temperatures that would otherwise be so cold as to be injurious or fatal. Controlling the temperature of the body of the plant, without also controlling the ambient air temperature, has been found to be sufficient to increase plant growth. Controlling the temperature of the body of the plant and roots while allowing the leaves to be exposed to different ambient air temperatures is believed to be similar to controlling human body temperature such as by use of a vest, while allowing extremities to be less protected.

Thus, for example, in circumstances where heating is required, the plants can be exposed to ambient air at a lower than optimal temperature while heat is provided by the conductive system to the metal growing trays. This results in greater economy by reducing or eliminating the cost of maintaining warm temperatures through heating of a large volume of air in a greenhouse, which can be adversely affected by heat losses through the outer surfaces of the greenhouse. Conversely, where cooling is required, plant temperatures may be economically controlled despite heat energy entering the greenhouse through its outer surfaces.

In addition, the direct temperature control and responsiveness of the plant growing system provided by the conductive heat transfer system of this invention protects the plants against sudden changes in ambient air temperature, whether hotter or cooler, to which the plants may be exposed in an open air (non-greenhouse) growing system. Such changes in air temperature will therefore be less injurious to plant growth.

The reduction in dependency on local climatic conditions and the greatly increased plant production capable with the system of the present invention which will enable growers to obtain increased yields, provide a solution to dwindling agricultural lands as they are depleted or absorbed by urbanization, and will enable production to be concentrated in smaller areas closer to centers of population thereby reducing expenses, including fuel costs, for the transportation of elements needed for plant growth and for shipment of harvested production.

Other modifications of the preferred embodiments could be made within the scope of the appended claims of the present invention. For example, the number and arrangement of pipes in relation to growing trays may be altered as long as adequate physical contact to facilitate heat transfer by conduction is maintained between the pipes, trays and growing medium.

It is also to be understood that many other variations, such as in the sizes and materials shown and described for the preferred embodiments, may be resorted to without departing from the scope of the invention as defined in the appended claims.

I claim:

1. A method for growing plants which comprises the steps of:
    (a) placing a plant growing medium and plants in a metal growing tray;
    (b) flowing in a closed metal piping system a liquid which will absorb heat;
    (c) placing said metal growing tray in metal to metal contact with said metal piping system by means of metal supports and disposed so that said metal piping system is external to and structurally supports said metal growing tray;
    (d) controlling the temperature of the flowing liquid in said piping system;
    (e) flowing a liquid plant nutrient solution from outside the growing tray onto the plant growing medium; and
    (f) controlling the temperature of said nutrient solution from outside said growing tray and prior to flowing said nutrient solution onto said plant growing medium by placing in conductive heat exchange relationship with the nutrient solution said metal piping system containing the temperature-controlled liquid.

2. A method for growing plants which comprises the steps of:
    (a) placing a plant growing medium and plants in a metal growing tray;
    (b) controlling the temperature of the growing tray by flowing a temperature-controlled liquid in a closed metal piping system placed in conductive heat exchange relationship with the growing tray by means of metal supports in contact with said metal piping system and said metal growing tray, disposed so that said metal piping system is external to and structurally supports said metal growing tray;
    (c) flowing a liquid plant nutrient solution from outside the growing tray onto the plant growing medium; and
    (d) controlling the temperature of said nutrient solution from outside said growing tray and prior to flowing said nutrient solution onto said plant growing medium by placing in conductive heat exchange relationship with the nutrient solution said metal piping system containing the temperature-controlled liquid.

3. The method of claim 1 or claim 2 wherein the step of flowing a liquid includes flowing water in the closed metal piping system.

4. The method of claim 1 or claim 2 including the additional step of providing artificial light containing wavelengths conducive to plant growth.

5. The method of claim 4 including the additional steps of:
    enclosing the plants and growing tray in a chamber having controlled communication with the outside atmosphere; and
    controlling the temperature, humidity and gaseous composition of the ambient air in the enclosed chamber.

6. An apparatus for growing plants comprising:
    (a) a metal growing tray containing a growing medium;
    (b) a closed metal piping system, in metal to metal contact with said metal growing tray by means of metal supports in contact with said metal piping system and said metal growing tray and disposed so that said metal piping system is external to and structurally supports said metal growing trays;
    (c) a liquid flowing in said closed piping system;
    (d) means to control the temperature and flow rate of said liquid;
    (e) means external to the growing tray for flowing a liquid plant nutrient solution onto the plant growing medium; and
    (f) means external to said growing tray and prior to said nutrient solution reaching said plant growing medium, for heat transfer between said plant nutrient solution and the closed metal piping system.

7. An apparatus as in claim 6 for growing plants in which the liquid is water.

8. An apparatus for growing plants comprising:
    (a) a metal growing tray containing a growing medium;

(b) a closed metal piping system, in metal to metal contact with said metal growing tray by means of metal supports in contact with said metal piping system, disposed so that said metal piping system is external to and structurally supports said metal growing tray;

(c) liquid flowing in the closed piping system;

(d) means to control the temperature and flow rate of the liquid;

(e) a chamber enclosing said growing trays and having controlled communication with the outside atmosphere;

(f) means for exposing the plants to artificial light containing wavelengths conducive to plant growth;

(g) means external to the growing tray for flowing a liquid plant nutrient solution onto the plant growing medium;

(h) means external to said growing tray and prior to said nutrient solution reaching said plant growing medium, for heat transfer between said plant nutrient solution and the closed metal piping system; and (i) means for controlling the temperature, humidity and gaseous composition of the ambient air in the enclosing chamber.

* * * * *